United States Patent [19]
Branning

[11] Patent Number: 5,367,346
[45] Date of Patent: Nov. 22, 1994

[54] EYEGLASS HINGE SYSTEM AND BOLT THEREFORE

[75] Inventor: Melvin C. Branning, Attleboro, Mass.

[73] Assignee: The Hilsinger Company L.P., Plainville, Mass.

[21] Appl. No.: 997,344

[22] Filed: Dec. 28, 1992

Related U.S. Application Data

[63] Continuation-in-part of Ser. No. 695,445, May 3, 1991, abandoned.

[51] Int. Cl.⁵ .............................................. G02C 5/22
[52] U.S. Cl. .................................... 351/153; 351/121; 351/140
[58] Field of Search ................ 351/153, 111, 121, 140; 411/411, 412

[56] References Cited

U.S. PATENT DOCUMENTS 3,427,681  3/1967  Smith, Jr. .......................... 351/153
4,033,615  7/1977  Miller et al. ....................... 411/412

Primary Examiner—William L. Sikes
Assistant Examiner—Hung Xuan Dang
Attorney, Agent, or Firm—Barlow & Barlow, Ltd.

[57] ABSTRACT

Eyeglass hinge system and bolt therefore for connecting the bow to the frame, wherein a hinge element is provided having a threaded bore in which the thread is either metric or U.S. standard and wherein the diameter, pitch diameter, and pitch dimensions of the bolt are intermediate in size to the corresponding dimensions of the metric and U.S. standard threads in the bore.

4 Claims, 2 Drawing Sheets

5,367,346

EYEGLASS HINGE SYSTEM AND BOLT THEREFORE

RELATED APPLICATION

This application is a Continuation-In-Part of application Ser. No. 07/695,445 filed May 3, 1991 now abandoned.

BACKGROUND OF THE INVENTION

In the field of ophthalmology, the commercial sale of eyeglasses has presented several problems. First of all, the oculist usually carries glasses frames that are both manufactured in foreign countries, as well as in the United States. The metric system of threads is usually used in foreign products, while the United States has its own standard, the two thread systems being different. The problem arises, particularly, in the case of the bolt which hinges the bows of the eyeglass to the main frame. It is not readily evident as to which type of thread is used in connection with the particular pair of glasses so that, even though the oculist may store bolts of the two types, he usually has difficulty deciding which one to use. The problem is particularly acute in repairing eyeglasses, since damage often takes place in the hinge itself. The customer who repairs his own eyeglasses usually must buy two bolts in order to be sure that when he arrives home, he has a bolt with the proper type of thread. Even so, he may damage the threads (on the bolt or in the hinge), while experimenting to determine which bolt will fit the thread in his hinge.

Some improvements have been made in the past in the so-called "temple" hinges. For instance, the U.S. patent of Weisgerber, U.S. Pat. No. 4,145,124, shows a bolt for use in an eyeglass hinge, which bolt has a tapered, serrated shank to lock it in place. The U.S. patent of Okner, U.S. Pat. No. 3,029,697, shows an eyeglass construction in which the resilience in a slit hinge ear is used to prevent the hinge bolt from loosening.

Considerable attention has also been paid to problems encountered in the field of machine threads, such as that shown in the U.S. patent of Bates, U.S. Pat. No. 1,447,056; in that patent a non-standard thread is used on a nut to lock it in place on the bolt. Similarly, the U.S. patent of Darling, U.S. Pat. No. 4,013,110, shows the use of threads of slightly different leads to promote locking. The U.S. patent of Miller, et al, U.S. Pat. No. 4,033,615, describes a system by which a valve port can accept any one of several standard pipe threads by providing the port with threads having a pitch midway between the NPT and the BSP pitches and using both tapered and parallel threads. The British patent No. 929,565 describes an electrical element consisting of a screw-threaded pin that is provided with both metric and English-measure threads. The British patent No. 1,454,769 describes a locking thread fastener having a root which is varied along its length to promote interference. All of these constructions require expensive thread-forming procedures and do not lend themselves to use with eyeglasses. These and other difficulties experienced with the prior art devices have been obviated in a novel manner by the present invention.

It is, therefore, an outstanding object of the invention to provide an eyeglass hinge system that permits the hinge to be easily repaired, irrespective of whether the eyeglasses were manufactured in the U.S. or in foreign countries.

Another object of this invention is the provision of a hinge construction for use in eyeglasses, which construction includes a bolt that is acceptable to both metric and U.S. standard threaded bores.

A further object of the present invention is the provision of a bolt that can be used by oculists or eyeglass owners to easily repair an eyeglass hinge.

A still further object of the invention is the provision of a system whereby foreign and domestic eyeglass manufacturers can use their own country's thread standard without acceptance problems in other countries.

It is a further object of the invention to provide an eyeglass hinge construction that permits repair of damaged eyeglasses without the necessity of determining which thread standard is used in the hinge.

With these and other objects in view, as will be apparent to those skilled in the art, the invention resides in the combination of parts set forth in the specification and covered by the claims appended hereto.

SUMMARY OF THE INVENTION

In general, the present invention relates to an eyeglass hinge system for use in connecting the eyeglass bows to the main frame. A hinge element is provided having a threaded bore, which thread is either metric or U.S. standard. A hinge bolt is threaded into the bore, the diameter, pitch diameter, and pitch dimensions of the bolt being intermediate in size to the corresponding dimensions of the metric and U.S. standard threads in the bore.

More specifically, the frame is provided with a plurality of primary plate elements, the bow is provided with a plurality of secondary plate elements, and the hinge element is one of the secondary elements. The series of plate elements are interleaved and terminate in an outer secondary plate hinge element which is provided with the said threaded bore.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
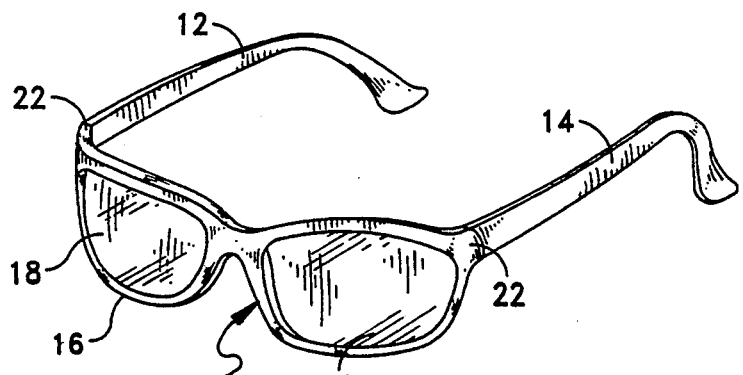
FIG. 1 is a perspective view of a pair of eyeglasses, incorporating the principles of the present invention.

Referring first to FIG. 1, which best shows the general features of the invention, the eyeglass hinge system indicated by the reference numeral 10 is shown in use in a pair of eyeglasses having bows 12 and 14 attached by hinges 22 to a main frame 16 having lenses 18 and 20.

Figure 2:
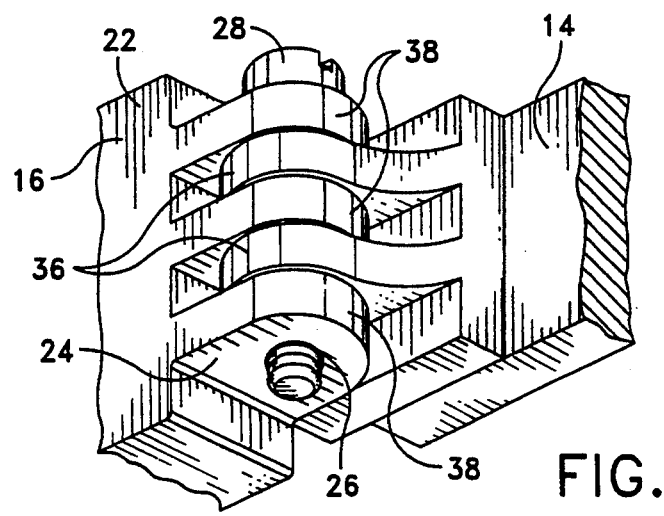
FIG. 2 is a perspective view of a hinge that forms part of the eyeglasses.

As illustrated in FIG. 2, the eyeglass hinge 22 is constructed with a hinge element 24 having a threaded bore 26. The thread in the bore is either metric or U.S. standard and the diameter, pitch diameter, and pitch dimensions are in either case similar. A hinge bolt 28 is threaded in the bore. The diameter, pitch diameter, and pitch of the bolt 28 are midway in size to the corresponding dimensions of the metric and U.S. standard threads in the bore.

The frame 16 is provided with a plurality of primary plate elements 36 and the bow 14 is provided with a plurality of secondary plate elements 38 that are interleaved with the primary plate elements. The hinge element 24 is one of the secondary plate elements 38.

The series of interleaved plate elements terminates in the outer secondary plate element 24, which element is provided with the said threaded bore 26.

Figure 3:
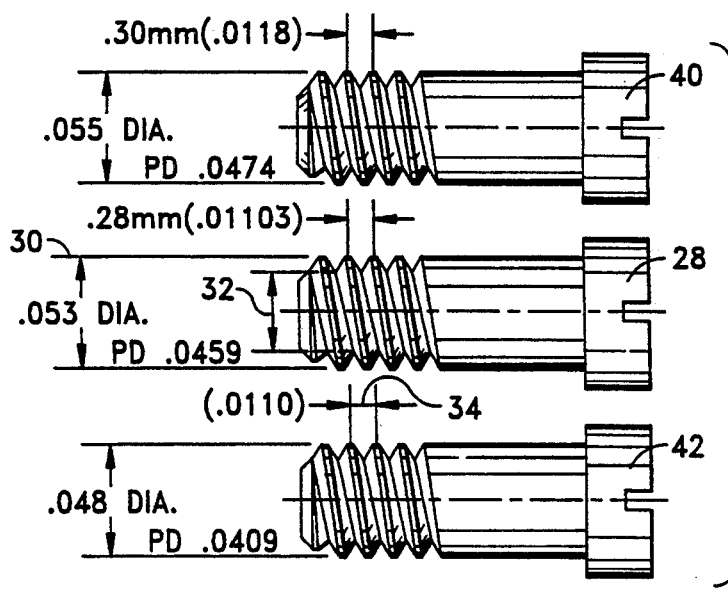
FIG. 3 is a chart comparing bolts with metric and U.S. standard threads to the bolt of the present invention.

An inspection of the chart in FIG. 3 shows that the diameter of the metric thread on a metric bolt 40 is 0.055", that the diameter of the U.S. standard thread on the bolt 42 is 0.048", and that the diameter of the thread on the bolt 28 of the invention is 0.053".

The pitch diameter of the thread on the metric bolt 40 is 0.0474", the pitch diameter of the U.S. standard thread on the bolt 42 is 0.0409" and the pitch diameter of the thread on the bolt 28 is 0.0459".

The pitch of the thread on the metric bolt 40 is 0.0118", the pitch of the U.S. standard thread on the bolt 42 is 0.011", and the pitch of the thread on the invention bolt 28 is 0.01103".

The operation and the advantages of the invention will now be readily understood in view of the above description. As has been stated, there are two types of screws or bolts used in temple hinges, i.e., metric and U.S. standard. The metric is usually a 1.4 mm screw with a 0.3 mm pitch. The U.S. standard thread, on the other hand, is about (0.048") 1.22 mm and has a pitch which is approximately (0.0110") 0.28 mm.

Figure 4:
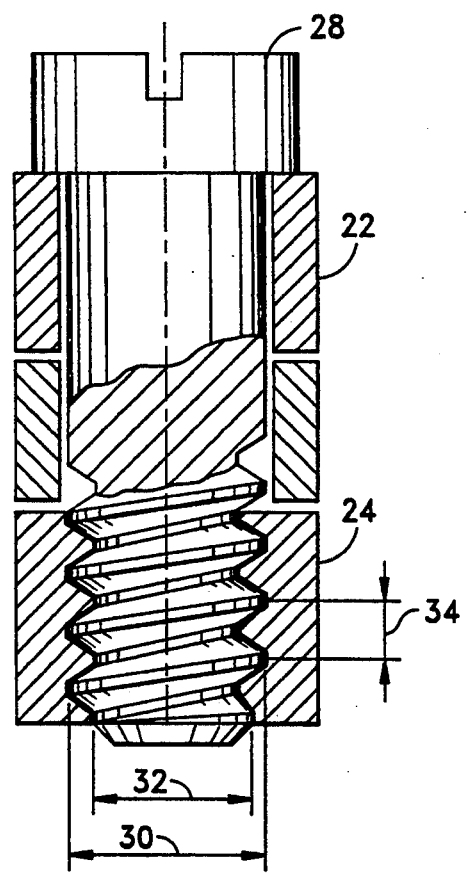
FIG. 4 is a sectional view of a hinge showing the bolt of the invention in use with a metric threaded bore.
Figure 5:
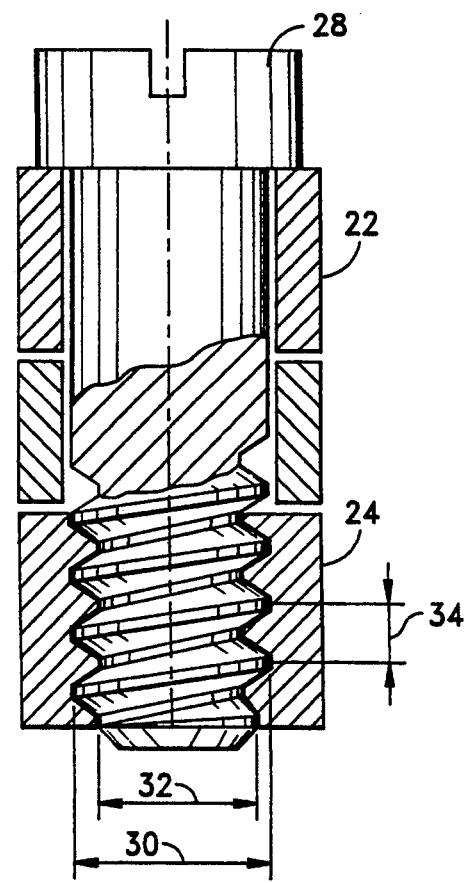
FIG. 5 is a sectional view of a hinge showing the bolt of the invention in use with a U.S. standard threaded bore.

The present invention uses a bolt which has a diameter of around 0.053" and has a pitch of 0.01103" (0.28 mm). The root or pitch diameter lies between 0.0474" and 0.0409". There is a tolerance in bolts of this nature (Class 2 medium thread engagement as defined in the *American Machinery Handbook*) of 0.0018", so they are well within tolerance. The end result, when this bolt is used as a barrel hinge with a metric thread as shown in FIG. 4, is that clearance appears on both the leading and the trailing edges. Normally taking for example a standard U.S. thread in the hinge, the threaded bore will have about a clearance of 0.0003". When incorporated in a hinge with a U.S. standard threaded bore, the appearance, as shown in FIG. 5, shows that engagement is along one side of the thread. These engagements between the threaded bore 26 and the threads of the bolt 28 lock the hinge 22 together; the resilience of the interleaved elements 36 and 38 cooperate with the thread engagement to provide a suitable situation for a permanent manufacture or repair.

The advantages of the invention will now be evident. The oculist, who is faced with a mixture of U.S. and foreign made eyeglasses, will be assisted in his everyday work. This is because he need not concern himself with determining whether he is dealing with U.S. or metric threads. He need only have a supply of bolts 28 formed in the manner of the invention. This is helpful, also, when he is called upon to fit bows of various lengths to the main frame. The eyeglass owner who wishes to repair his glasses himself can purchase a single bolt for that purpose and, more importantly, he is not called upon to determine whether his glasses have metric or U.S. standard threads. He is not likely to damage his glasses by attempting to force the wrong bolt into the hinge.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. In an eyeglass hinge system having a threaded bore for connecting an eyeglass bow to a main frame, a bolt for use with a hinge element of either metric or U.S. standard, comprising a hinge bolt adapted to be threaded into a threaded bore wherein the outside diameter and pitch diameter, and pitch of the hinge bolt are intermediate in size to the corresponding dimensions of the metric and U.S. standard threads, said hinge bolt pivotally fastening an eyeglass bow to an eyeglass main frame.

2. A bolt having universal threads for use with a temple hinge for eyeglasses having a bore of substantially 0.048" threaded with metric threads having a root diameter of substantially 0.055" comprising a male threaded bolt having an outside diameter of substantially 0.053" and a pitch diameter of substantially 0.045" and a pitch substantially 0.0110" wherein the bolt will engage at least five threads of the temple hinge threaded bore, said male threaded bolt pivotally fastening an eyeglass bow to an eyeglass main frame.

3. A bolt having universal threads for use with a temple hinge for eyeglasses having an unknown standard threaded bore comprising a male threaded bolt having an outside diameter of substantially 0.053" and a pitch diameter of substantially 0.045" and a pitch substantially 0.0110" wherein the bolt will engage at least five threads of the threaded temple hinge bore, said male threaded bolt pivotally fastening an eyeglass bow to an eyeglass main frame.

4. A bolt as in claim 3 wherein the bore in the temple hinge is substantially 0.041" and is threaded with U.S. standard threads.

* * * * *